(12) United States Patent
Schwab et al.

(10) Patent No.: US 9,094,694 B2
(45) Date of Patent: *Jul. 28, 2015

(54) VIDEO INPUT SWITCHING AND SIGNAL PROCESSING APPARATUS

(71) Applicant: Videa, LLC, West Bloomfield, MI (US)

(72) Inventors: Barry H. Schwab, West Bloomfield, MI (US); John G. Posa, Ann Arbor, MI (US)

(73) Assignee: Videa, LLC, West Bloomfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,549

(22) Filed: Jul. 1, 2014

(65) Prior Publication Data

US 2014/0317656 A1  Oct. 23, 2014

Related U.S. Application Data

(63) Continuation of application No. 13/025,838, filed on Feb. 11, 2011, now Pat. No. 8,769,561, which is a continuation of application No. 08/822,397, filed on Mar. 20, 1997, now Pat. No. 7,917,922, which is a continuation-in-part of application No. 08/488,691, filed on Jun. 8, 1995, now abandoned.

(51) Int. Cl.
*H04N 7/173* (2011.01)
*H04N 7/16* (2011.01)
*H04N 21/235* (2011.01)
*H04N 21/426* (2011.01)
*H04N 21/434* (2011.01)
*H04N 21/475* (2011.01)
*H04N 21/258* (2011.01)
*H04N 21/41* (2011.01)
*H04N 21/45* (2011.01)

(Continued)

(52) U.S. Cl.
CPC ....... *H04N 21/235* (2013.01); *H04N 21/25891* (2013.01); *H04N 21/4113* (2013.01); *H04N 21/4126* (2013.01); *H04N 21/4263* (2013.01); *H04N 21/434* (2013.01); *H04N 21/4532* (2013.01); *H04N 21/4755* (2013.01); *H04N 21/84* (2013.01)

(58) Field of Classification Search
USPC ............. 725/110, 135, 136, 59, 109, 140, 37, 725/38, 32–36, 112–113, 46; 348/460, 461, 348/553, 731
See application file for complete search history.

(56) References Cited

U.S. PATENT DOCUMENTS 3,975,583 A   8/1976   Meadows
4,337,480 A   6/1982   Bourassin et al.
(Continued)

FOREIGN PATENT DOCUMENTS

WO   WO-94/03995   2/1994

*Primary Examiner* — Pankaj Kumar
*Assistant Examiner* — Reuben M Brown
(74) *Attorney, Agent, or Firm* — Gifford, Krass, Sprinkle, Anderson & Citkowski, P.C.

(57) ABSTRACT

An apparatus integrates a plurality of television signal sources into a cohesive audio/video environment. Internal provisions include a standard broadcast-frequency tuner, cable tuner as well as other optional inputs such as for a direct-broadcast satellite, previously recorded video material, etc. In the preferred embodiment, means are provided whereby a main or primary program channel may be linked to additional channels providing supplementary information to enhance resolution, sound quality, or to facilitate special effects.

20 Claims, 2 Drawing Sheets

(51) Int. Cl.
  *H04N 21/84* (2011.01)
  *H04N 7/10* (2006.01)

(56) References Cited

U.S. PATENT DOCUMENTS

| | | | |
|---|---|---|---|
| 4,488,179 A | 12/1984 | Kruger et al. |
| 4,536,791 A | 8/1985 | Campbell et al. |
| 4,554,579 A | 11/1985 | Citta |
| 4,602,279 A | 7/1986 | Freeman |
| 4,630,108 A | 12/1986 | Gomersall |
| 4,734,764 A | 3/1988 | Pocock et al. |
| 4,743,764 A | 5/1988 | Casey et al. |
| 4,751,578 A | 6/1988 | Reiter et al. |
| 4,792,849 A | 12/1988 | McCalley et al. |
| 4,829,372 A | 5/1989 | McCalley et al. |
| 4,860,123 A | 8/1989 | McCalley et al. |
| 4,866,522 A | 9/1989 | Beckley |
| 4,866,787 A | 9/1989 | Olesen |
| 4,888,638 A | 12/1989 | Bohn |
| 4,905,094 A | 2/1990 | Pocock et al. |
| 4,930,160 A | 5/1990 | Vogel |
| 4,941,040 A | 7/1990 | Pocock et al. |
| 5,003,591 A | 3/1991 | Kauffman et al. |
| 5,014,125 A | 5/1991 | Pocock et al. |
| 5,029,014 A | 7/1991 | Lindstrom |
| 5,077,607 A | 12/1991 | Johnson et al. |
| 5,113,496 A | 5/1992 | McCalley et al. |
| 5,119,188 A | 6/1992 | McCalley et al. |
| 5,155,591 A | 10/1992 | Wachob |
| 5,191,410 A | 3/1993 | McCalley et al. |
| 5,195,092 A | 3/1993 | Wilson et al. |
| 5,208,665 A | 5/1993 | McCalley et al. |
| 5,212,553 A | 5/1993 | Maruoka |
| 5,231,494 A | 7/1993 | Wachob |
| 5,321,846 A | 6/1994 | Yokota et al. |
| 5,424,770 A | 6/1995 | Schmelzer et al. |
| 5,440,632 A | 8/1995 | Bacon et al. |
| 5,481,296 A | 1/1996 | Cragun et al. |
| 5,481,542 A | 1/1996 | Logston et al. |
| 5,485,221 A | 1/1996 | Banker et al. |
| 5,488,425 A | 1/1996 | Grimes |
| 5,493,339 A | 2/1996 | Birch et al. |
| 5,528,304 A | 6/1996 | Cherrick et al. |
| 5,534,944 A | 7/1996 | Egawa et al. |
| 5,539,920 A | 7/1996 | Menand et al. |
| 5,550,576 A | 8/1996 | Klosterman |
| 5,557,333 A | 9/1996 | Jungo et al. |
| 5,559,549 A | 9/1996 | Hendricks et al. |
| 5,574,964 A | 11/1996 | Hamlin |
| 5,585,858 A | 12/1996 | Harper et al. |
| 5,600,366 A | 2/1997 | Schulman |
| 5,612,742 A | 3/1997 | Krause et al. |
| 5,630,757 A | 5/1997 | Gagin et al. |
| 5,636,346 A | 6/1997 | Saxe |
| 5,652,615 A | 7/1997 | Bryant et al. |
| 5,661,516 A | 8/1997 | Carles |
| 5,664,046 A | 9/1997 | Abecassis |
| 5,687,095 A | 11/1997 | Haskell et al. |
| 5,689,799 A | 11/1997 | Dougherty et al. |
| 5,708,664 A | 1/1998 | Budge et al. |
| 5,715,018 A | 2/1998 | Fasciano et al. |
| 5,724,091 A | 3/1998 | Freeman et al. |
| 5,761,601 A | 6/1998 | Nemirofsky et al. |
| 5,774,170 A | 6/1998 | Hite et al. |
| 5,786,845 A * | 7/1998 | Tsuria .......................... 725/32 |
| 5,812,790 A | 9/1998 | Randall |
| 5,819,034 A * | 10/1998 | Joseph et al. .................. 709/201 |
| 5,848,352 A | 12/1998 | Dougherty et al. |
| 5,859,660 A | 1/1999 | Perkins et al. |
| 5,861,919 A | 1/1999 | Perkins et al. |
| 5,862,140 A | 1/1999 | Shen et al. |
| 5,864,823 A | 1/1999 | Levitan |
| 5,883,677 A | 3/1999 | Hofmann |
| 5,886,731 A | 3/1999 | Ebisawa |
| 5,889,950 A | 3/1999 | Kuzma |
| 5,894,320 A | 4/1999 | Vancelette |
| 5,917,830 A | 6/1999 | Chen et al. |
| 5,926,205 A | 7/1999 | Krause et al. |
| 5,956,088 A | 9/1999 | Shen et al. |
| 5,966,120 A | 10/1999 | Arazi et al. |
| 5,969,715 A | 10/1999 | Dougherty et al. |
| 6,006,257 A | 12/1999 | Slezak |
| 7,917,922 B1 | 3/2011 | Schwab et al. |
| 2001/0034883 A1 | 10/2001 | Zigmond |
| 2004/0261127 A1 | 12/2004 | Freeman et al. |
| 2011/0138426 A1 | 6/2011 | Schwab et al. |

\* cited by examiner

VIDEO INPUT SWITCHING AND SIGNAL PROCESSING APPARATUS

REFERENCE TO RELATED APPLICATIONS

This application is a continuation of U.S. patent application Ser. No. 13/025,838, filed Feb. 11, 2011, which is a continuation of U.S. patent application Ser. No. 08/822,397, filed Mar. 20, 1997, now U.S. Pat. No. 7,917,922, which is a continuation of U.S. patent application Ser. No. 08/488,691, filed Jun. 8, 1995, now abandoned. The entire content of each application is incorporated herein by reference.

FIELD OF THE INVENTION

This invention generally relates to video equipment, and more particularly, to a converter arrangement operative to configure a plurality of input sources into an integrated operating environment.

BACKGROUND OF THE INVENTION

Television viewers are often faced with complicated wiring requirements for integrating the various signal sources into their systems. This situation was made worse in part by the Federal Cable Regulation Act of 1992, which caused some cable systems to discontinue carriage of local Broadcast stations that insist on receiving a per-subscriber fee to allow retransmission of their signals. As a result, cable subscribers on these systems must provide their own antennas in order to receive signals from these broadcast stations.

With the availability of signals from direct-broadcast satellites, many consumers will consequently have three different signal sources to choose from when viewing, with the added confusion that all three of these sources may provide channels with the same numerical designation. A further complication is the integration of cable converters with the public switched telephone network, for billing special event programming and various other pay-per-view schemes.

SUMMARY OF THE INVENTION

The invention comprises an apparatus for integration of a plurality of television signal sources into a single system. Internal provisions include a standard broadcast-frequency tuner as well as a cable tuner. The cable tuner may optionally include provisions for a descrambler module for premium or pay-per-view services, which may be implemented either as an internal circuit board, an internal plug-in module, or an external plug-in unit. A third input is provided as a direct-broadcast-satellite tuner, which itself may be implemented as an internal circuit board or as an internal or external plug-in unit. As is the case for the cable tuner, provisions are included for a separate descrambler unit implemented as an internal circuit board or as an internal or external plug-in unit. As a further option, additional inputs may be provided for other uses, such as VCR playback signals. Outputs are provided both for baseband audio and video, and also through an RF modulator.

A system controller, which accepts control signals from a standard infrared-type hand-held remote-controller, handles such tasks as input selection and channel switching, and allows the user to reassign channel designations at will, even including input switching as part of the channel selection. The controller also integrates signals for an optional telephone interface, for pay-per-view billing or other uses. When required, the controller is further capable of enabling descrambling circuitry as appropriate for each signal source. In like manner, specialized modules (as, for example, MPEG decoders and the like) may be enabled or have their operating parameters configured so as to process digitally encoded signals. In a preferred embodiment, the unit may be provided with additional tuner provisions associated with any of the various inputs, for receiving signals in which a primary signal is on one channel, and a secondary signal is on a different channel, as, for example, in the case of a stereoscopic broadcast system in which one channel carried the "left eye" signal, and a second channel carried the "right-eye" signal.

DETAILED DESCRIPTION OF THE INVENTION

Figure 1:
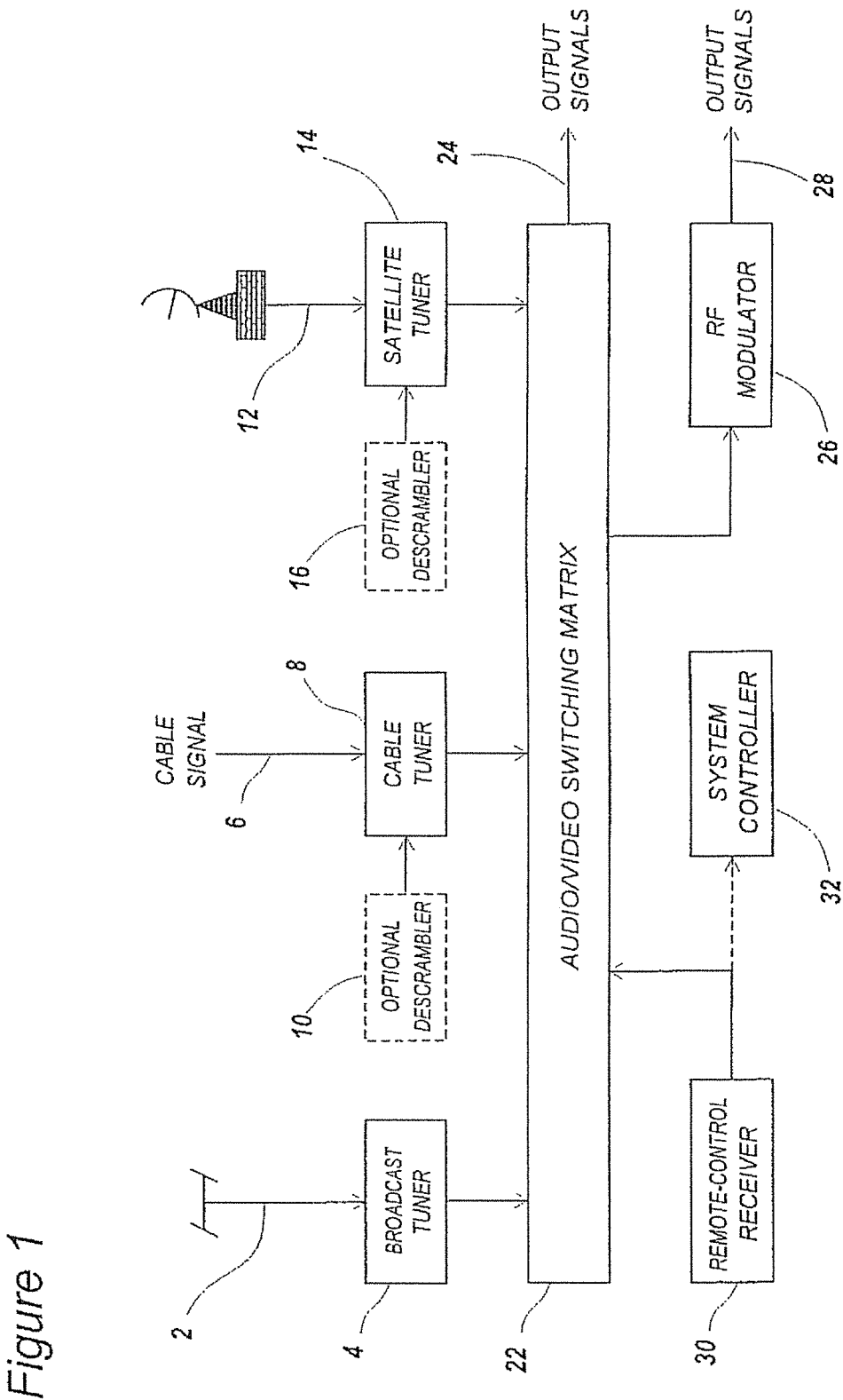
FIG. 1 is a block diagram which illustrates the main features of the invention.

The invention is explained by way of reference to FIG. 1, which shows the main features of a system having input switching provisions. Broadcast-frequency signals 2 from a standard antenna are received at the broadcast tuner 4. These signals are demodulated into baseband audio and video signals, which then are provided to the audio/video switching matrix 22. Cable system signals 6 are provided to the cable tuner 8, which as an option may include a descrambler module 10; this may be implemented either as an internal circuit board, an internal plug-in module, or an external plug-in unit, and this unit would be compatible with the scrambling system used on the particular cable system. Depending upon the circumstances, one or more of the various tuners may interface to a decoder to receive other specialized information such as teletext or closed-captioning, though not referenced in the figures.

Optional satellite-receiver signals 12 are provided to the satellite tuner 14, which, like the cable tuner, also may include an optional descrambler unit 16, implemented through a similar range of methods as described above for the cable tuner. In some installations, the satellite receiver service would include its own tuner and/or descrambler means, in which case the signals would be input to the cable converter through one of several direct-connection inputs (not shown). These inputs would also allow for the integration of other sources, such as VCR playback signals. All of these input sources are demodulated and provided to the audio/video switching matrix as baseband audio and video signals, enabling signal routing within the audio/video switching matrix to be implemented as a baseband video "bus." The selected signal from the switching matrix is provided at the output 24; these signals are also optionally provided to an RF modulator 26, for output as modulated signals 28.

In the preferred embodiment, the system provides for the association of one channel with one or more other channels carrying supplemental information. For example, one channel might carry the "left-eye" view of a stereoscopic signal, while a second channel carried the "right-eye" view. Such additional channels may alternatively provide the following types of supplemental information, though the entire range of available information is by no means limited to this list:

picture enhancement information (as suggested by several of the proposed HDTV systems) to provide wide-screen or other effects;

video-game related information, including information related to additional players;

digital data, such as statistical information about players in a sporting event or pricing/account information associated with a shopping channel;

additional audio information, including information which provides higher fidelity, stereophonic/surround-sound effects, foreign language audio, "sing-along" lyrics to accompany a popular music concert, etc.

teletext or closed-captioning information.

In this embodiment of the invention, a primary channel will typically early "primary" program information along with additional information used by the system for directing a second tuner to a secondary channel; other channels could be similarly associated. The information relating a primary channel to one or more secondary channels carrying supplemental information may be derived in various ways. For example, the primary channel may carry a pointer to the additional channel(s), for example, in a subcarrier, or as part of synchronization as during vertical retrace. Such a pointer may be carried more or less continuously by the primary channel, or may be broadcast more infrequently, for example, at the start of a program. As an aid in the scrambling and/or encryption of a program, information relating the programs may be downloaded and locally stored on an authorized basis. As a further measure, a "channel-hopping" scheme may be used, wherein different related channels are used at different times, with only authorized viewers being provided with the overall plan.

As an alternative to the broadcasting of information relating channels, codes may be published in a format similar to the currently available VCR Plus system now in use for VCR programming. That is, in addition to a code which contains start/stop times and a single channel number, the same or a different code may also contain multiple channels designations, certain of which provide the supplementary information. As in the current implementation of VCR Plus, such code may be entered in the system's hand-held remote control for reception by the receiver 30 depicted in FIG. 1. Other means for receiving and storing these codes are also possible, including downloading from a personal computer, and so forth. Regardless of the technique used to derive the additional programming information, on-screen programming techniques may be used to enable a user to program in the information so as to label it, for example, to designate a particular channel of the decoder to identify the station call letters or to provide more descriptive information.

Figure 2:
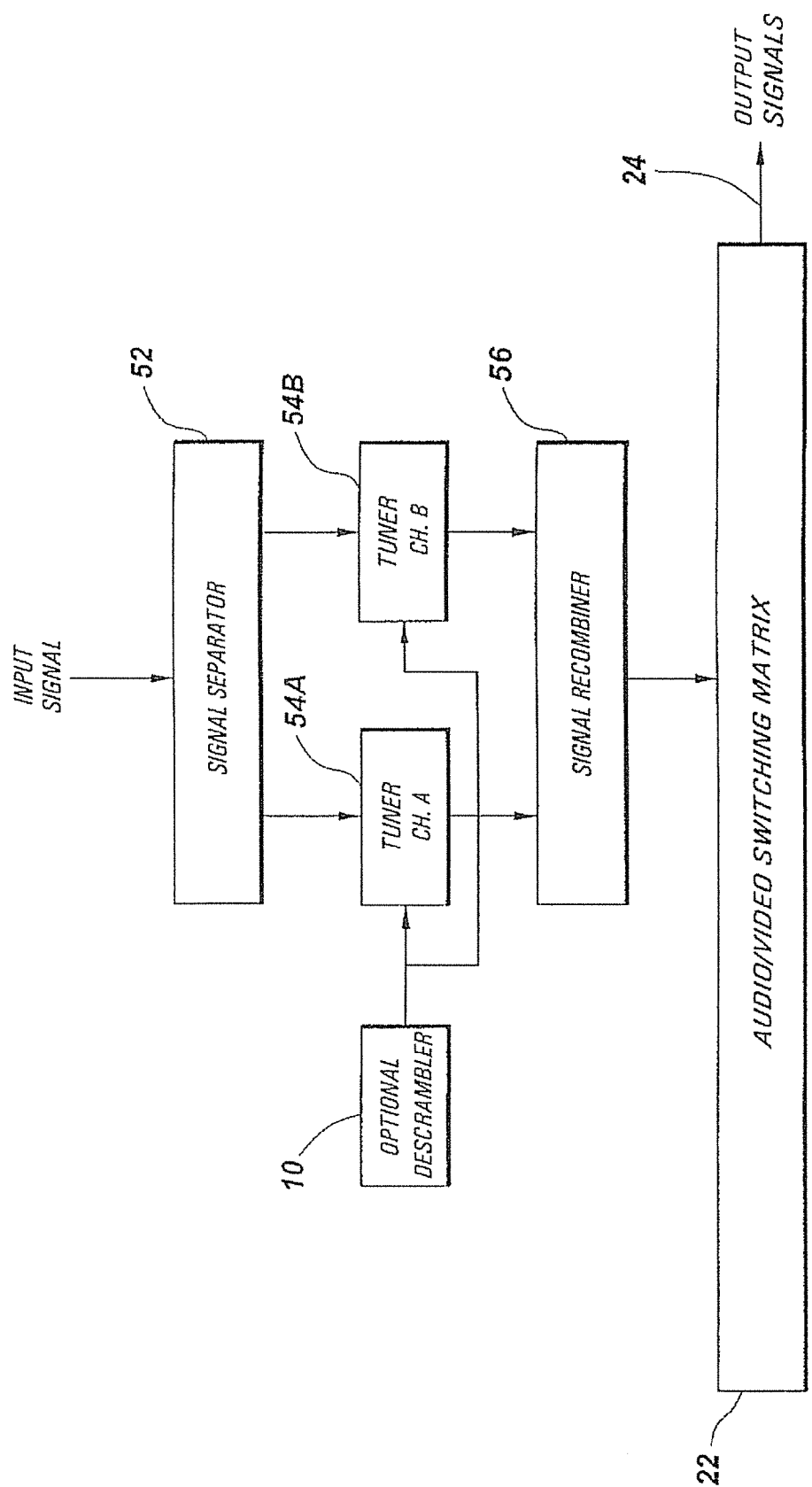
FIG. 2 is a block diagram which shows signal separation and recombination means associated with providing supplemental program information.

As shown in FIG. 2, these features may be implemented with a signal separator 52, feeding primary and secondary signals to individual tuners 54A and 54B interfaced to an optional descrambler 10. A signal recombiner 56 is preferably used prior to the audio/video switching matrix 24, providing a combined signal output at 24. It will be appreciated by those of skill in the art of audio/video mixing and control that other circuit implementations may be used to carry out the broad goal of the invention to integrate multiple inputs to provide a cohesive enjoyment environment. For example, if desired, provisions may be included for an additional internal or external plug-in module (not shown), with associated outputs, to provide modified signals for these special purposes. In addition, the system may be adapted to provide multiple outputs enabling a user to record the separate programs associated with all participating channels for subsequent playback. Such playback may occur, for example, through the system comprising the invention, through separate inputs and using single recombiner 56 shown in FIG. 2 where advantageous.

The operation of the entire unit is controlled by a system controller 32. This controller may receive input signals from an infrared remote-control receiver 30, or from any of a variety of user input devices, such as keyboards or computer interfaces (not shown). In addition, it is capable of communicating with the public switched telephone network, through an optional telephone interface (not shown), enabling the cable converter unit to interface with systems which provide pay-per-view services or other specialized billing and program-ordering schemes.

Another feature of the invention is the ability to manipulate channel assignments by way of the system controller. For example, the user may choose to assign cable converter channels 1, 2, and 3 to broadcast channels 2, 4, and 7; the user might choose to assign cable converter channel 4 to cable system channel 40, and cable converter channel 5 to direct-broadcast satellite channel 15. In this way, the user is able to select any channel line-up desired, including the channels selected from all sources available in any order, and with any channel numerical designation. Although not shown, it is to be understood that system controller 32 interfaces to an appropriate memory device for storing these channel assignments, including the user-defined designations.

In an alternative embodiment, optional MPEG decoders or other digital signal processors (not shown) may be enabled and/or have their operating parameters configured under control of the system controller, using a similar modular approach to that described herein above with reference to descrambler modules.

What is claimed is:

1. A video viewing system, comprising:
   a system controller and a display device disposed at a viewer location;
   an input for receiving information at the system controller regarding a viewing preference;
   a video program switching unit controlled by the system controller;
   a plurality of video program inputs to the video program switching unit, including a first input for receiving a primary digital video program with a pointer to a second input carrying supplemental information directly related to the primary digital video program; and
   wherein the controller is operative to perform the following functions:
   (a) display the primary digital video program on the display device and, upon the occurrence of the pointer in the primary digital video program,
   (b) cause the video program switching unit to automatically display the supplemental information on the display device without any operator intervention in accordance with the viewing preference.

2. The system of claim 1, wherein the supplemental information is HDTV, wide-screen, or other picture-enhancement information.

3. The system of claim 1, wherein the supplemental information relates to one or more players in a video game.

4. The system of claim 1, wherein the supplemental information includes information about a sporting event.

5. The system of claim 1, wherein the supplemental information includes pricing or account information associated with a shopping channel.

6. The system of claim 1, wherein the supplemental information includes audio information providing higher fidelity or surround-sound effects.

7. The system of claim 1, wherein the supplemental information includes text or closed-captioning information.

8. The system of claim 1, further including a hand-held remote control for entering a viewing preference.

9. The system of claim 1, further including a keyboard for entering a viewing preference.

10. The system of claim 1, further including an interface to a computer for entering the viewing preference.

11. The system of claim 1, further including an interface to a program pay-per-view service.

12. The system of claim 1, further including an interface to a program-ordering and billing service.

13. The system of claim 1, wherein the primary digital video program includes a plurality of pointers to a plurality of alternate inputs carrying supplemental information directly related to the program.

14. The system of claim 1, further including a memory for storing input channel assignments, including the user-defined channel designations.

15. The system of claim 1, wherein the system controller is further operative to implement a channel-hopping scheme causing the video switching unit to use different inputs at different times.

16. The system of claim 1, wherein:
the system controller is further operative to implement a channel-hopping scheme causing the video switching unit to use different inputs at different times; and
the scheme is known only to authorized viewers.

17. The system of claim 1, wherein system controller includes an MPEG decoder.

18. The system of claim 1, wherein system controller includes a program descrambler.

19. The system of claim 1, wherein the supplemental information provides right- or left-eye information in conjunction with a stereoscopic broadcast.

20. The system of claim 1, wherein the supplemental information provides sing-along lyrics to accompany music.

* * * * *